(12) United States Patent
Lee et al.

(10) Patent No.: US 8,921,004 B2
(45) Date of Patent: Dec. 30, 2014

(54) ION EXCHANGE MEMBRANE FILLING COMPOSITION, METHOD OF PREPARING ION EXCHANGE MEMBRANE, ION EXCHANGE MEMBRANE, AND REDOX FLOW BATTERY

(71) Applicant: Samsung Electronics Co., Ltd., Suwon-si (KR)

(72) Inventors: Myung-jin Lee, Seoul (KR); Joung-won Park, Seongnam-si (KR); Duk-jin Oh, Seoul (KR); Doo-yeon Lee, Yongin-si (KR); Moon-sung Kang, Seoul (KR); Ji-su Kim, Seoul (KR); Hyeon-jung Cha, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1 day.

(21) Appl. No.: 13/720,947

(22) Filed: Dec. 19, 2012

(65) Prior Publication Data
US 2013/0316268 A1   Nov. 28, 2013

(30) Foreign Application Priority Data

May 25, 2012  (KR) ........................ 10-2012-0056233

(51) Int. Cl.
*H01M 8/10* (2006.01)
*H01M 8/20* (2006.01)
*H01M 8/18* (2006.01)

(52) U.S. Cl.
CPC ............... *H01M 8/102* (2013.01); *H01M 8/20* (2013.01); *H01M 8/188* (2013.01); *H01M 8/1023* (2013.01); *Y02E 60/528* (2013.01); *Y02E 60/523* (2013.01)
USPC .......................................... 429/493; 429/492

(58) Field of Classification Search
CPC ....... H01M 8/20; H01M 8/102; H01M 8/188; H01M 8/1039; Y02E 60/528
USPC ........ 252/182.1, 364; 429/105, 107, 492, 493
See application file for complete search history.

(56) References Cited

U.S. PATENT DOCUMENTS

| | | | |
|---|---|---|---|
| 7,344,791 B1 | 3/2008 | Yamaguchi et al. | |
| 2003/0168404 A1* | 9/2003 | Mika et al. ................... | 210/639 |
| 2005/0011826 A1* | 1/2005 | Childs et al. .................. | 210/490 |
| 2006/0234129 A1 | 10/2006 | Ovshinsky et al. | |
| 2010/0279204 A1 | 11/2010 | Isomura et al. | |
| 2011/0189549 A1* | 8/2011 | Sun et al. ....................... | 429/338 |
| 2011/0281197 A1 | 11/2011 | Daikoku et al. | |
| 2011/0290714 A1* | 12/2011 | Inoue et al. ................... | 210/496 |

FOREIGN PATENT DOCUMENTS

| | | |
|---|---|---|
| CN | 102068919 B | 5/2011 |
| JP | 63-024565 A | 2/1988 |
| KR | 1020110088881 A | 8/2011 |

OTHER PUBLICATIONS

Byun, H.S. et al., Preparation of Ion-exchange Membranes based on PVDF with Pore-filling Technique, Dept. of Chemical System Engineering, Keimyung University, Daegu, 704-701, S. Korea.

(Continued)

*Primary Examiner* — Stewart Fraser
(74) *Attorney, Agent, or Firm* — Cantor Colburn LLP (57) ABSTRACT

A composition for filling an ion exchange membrane including a first aromatic vinyl monomer having a halogenated alkyl group or a quaternary ammonium salt group, a method of preparing the ion exchange membrane, an ion exchange membrane prepared using the method, and a redox flow battery including the ion exchange membrane.

13 Claims, 6 Drawing Sheets

(56) References Cited

OTHER PUBLICATIONS

Ohya, H. et al., Studies on Membranes for a Redox-Flow Battery VIII.; Electrical Resistivity and Permeabilities of Composite Membranes Based on Neutral Porous Membranes, Denki Kakagu, 1990, vol. 58 (11): 1022-1028.

Park, B.K. et al., Pore-filled PVDF: Preparation and Application of Pore-filled PVDF Ion Exchange Membranes, Membrane Journal, 2004, vol. 14(2): 108-116.

* cited by examiner

ION EXCHANGE MEMBRANE FILLING COMPOSITION, METHOD OF PREPARING ION EXCHANGE MEMBRANE, ION EXCHANGE MEMBRANE, AND REDOX FLOW BATTERY

CROSS-REFERENCE TO RELATED APPLICATIONS

This application claims priority to and the benefit of Korean Patent Application No. 10-2012-0056233, filed on May 25, 2012, and all the benefits accruing therefrom under 35 U.S.C. §119, the content of which is incorporated herein in its entirety by reference.

BACKGROUND

1. Field

The present disclosure relates to ion exchange membrane filling compositions, method of preparing ion exchange membranes, ion exchange membranes, and redox flow batteries, and more particularly, to ion exchange membrane filling compositions including aromatic vinyl monomers having halogenated alkyl groups or quaternary ammonium salt groups, methods of preparing ion exchange membranes by using the same, ion exchange membranes prepared using the methods, and redox flow batteries including the ion exchange membranes.

This invention is derived from research conducted as part of the Energy Resources Technology Development Project supported by the Ministry of Knowledge Economy (Task administration number: 2009T100200045, Development of redox flow battery with high energy density).

2. Description of the Related Art

A general secondary battery converts electric energy into chemical energy and stores the chemical energy, during charging. Subsequently, during discharging, the battery converts the stored chemical energy into electric energy and outputs the electric energy.

Like the general secondary battery, a redox flow battery also converts electric energy by charging into chemical energy and stores the chemical energy. Subsequently, during discharging, the redox flow battery converts the stored chemical energy into electric energy and outputs the electric energy. However, in contrast to the general secondary battery, an electrode active material retaining energy in the redox flow battery is present in a liquid state, and therefore, a tank for storing the electrode active material is needed.

In particular, in a redox flow battery, each electrolyte (i.e., a catholyte and an anolyte) function as an electrode active material. A typical example of these electrolytes is a transition metal oxide solution. Thus, in a redox flow battery, the catholyte and the anolyte need to be stored in a tank as solutions containing a redox transition metal in which the oxidation state is changeable.

Like a fuel cell, a redox flow battery has a cell for generating electric energy which includes a cathode, an ion exchange membrane and an anode. The catholyte and anolyte are supplied to the cell via corresponding pumps. At the respective contact surfaces, transition metal ions included in the respective electrolytes are either oxidized or reduced. At this point, an electromotive force corresponding to the Gibbs free energy is generated. The electrodes do not directly participate in the reactions and only aid oxidation/reduction of transition metal ions included in the catholyte and the anolyte.

In a redox flow battery, the ion exchange membrane does not directly participate in the oxidation/reduction reactions and performs (i) a function of quickly transferring ions that constitute a charge carrier between the catholyte and the anolyte, (ii) a function of preventing direct contact between a cathode and an anode, and most importantly (iii) a function of suppressing crossover of electrolyte active ions that are dissolved in the catholyte and the anolyte and directly participate in the reactions.

A conventional ion exchange membrane for a redox flow battery is mainly used to selectively separate ions in an aqueous solution. Accordingly, ion mobility characteristics and film properties in the aqueous solution of the redox battery have been optimized. However, there is an unmet need in an ion exchange membrane for a redox flow battery which would have optimized ion mobility characteristics and film properties in a non-aqueous system.

SUMMARY

Provided are ion exchange membrane filling compositions including aromatic vinyl monomers having halogenated alkyl groups or quaternary ammonium salt groups.

Provided are methods of preparing ion exchange membranes by using the ion exchange membrane filling compositions.

Provided are ion exchange membranes prepared by using the methods.

Provided are redox flow batteries including the ion exchange membranes.

Additional aspects will be set forth in part in the description which follows and, in part, will be apparent from the description, or may be learned by practice of the presented embodiments.

According to an aspect of the present disclosure, an ion exchange membrane filling composition includes a first aromatic vinyl monomer having a halogenated alkyl group or a quaternary ammonium salt group.

The halogenated alkyl group may include 1 to 10 carbon atoms.

The first aromatic vinyl monomer may include at least one selected from vinylbenzyl chloride ("VBC"), (vinylbenzyl)trimethylammonium chloride, 1-allyl-3-methylimidazolium chloride, and O-allyl-N-benzylcinchonidinium chloride.

The ion exchange membrane filling composition may further include at least one of a second aromatic vinyl monomer and a cross-linking agent.

The second aromatic vinyl monomer may include at least one selected from styrene, benzylmethacrylate, phenylmethacrylate, and bisphenol A dimethacrylate; and the cross-linking agent may include at least one selected from divinylbenzene ("DVB"), glutaraldehyde, glycidyl methacrylate, diethylene glycol, and dimethacrylate.

An amount of the second aromatic vinyl monomer may be 1.0 mole or less per 1.0 mole of the first aromatic vinyl monomer, and an amount of the cross-linking agent may be 0.5 moles or less per a total of 1.0 mole of the first aromatic vinyl monomer and the second aromatic vinyl monomer.

The ion exchange membrane filling composition may further include a solvent.

The solvent may include at least one compound selected from water, methanol, ethanol, dimethylacetamide ("DMA"), N-methyl-2-pyrrolidone ("NMP"), dimethylformamide ("DMF"), dimethyl sulfoxide ("DMSO"), and tetrahydrofuran ("THF").

An amount of the solvent in the ion exchange membrane filling composition may be in a range of 0 to about 50 percent by weight ("weight %", or "wt %").

The ion exchange membrane filling composition may further include a thermal polymerization initiator or a photopolymerization initiator.

According to another aspect of the present disclosure, a method of preparing an ion exchange membrane includes impregnating a porous substrate film having ion exchanging properties with the ion exchange membrane filling composition; and polymerizing the impregnated ion exchange membrane filling composition.

The porous substrate film may include at least one compound selected from polyolefin, polytetrafluoroethylene, polyetheretherketone, polysulfone, polyimide, and polyamideimide.

According to another aspect of the present disclosure, an ion exchange membrane includes a polymerization product of the ion exchange membrane filling composition described above.

The ion exchange membrane may have an ion exchange capacity of about 2.0 meq/g dry weight to 5.0 meq/g dry weight.

The ion exchange membrane may have a thickness of about 20 micrometers ("μm") to about 100 μm.

According to another aspect of the present disclosure, a redox flow battery may include a catholyte, an anolyte, and the ion exchange membrane disposed between the catholyte and the anolyte.

The ion exchange membrane may be an anion exchange membrane, and at least one of the catholyte and the anolyte may be an organic electrolyte.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, the term "alkyl" indicates a completely saturated, branched or unbranched (or a straight or linear) hydrocarbon. Non-limiting examples of the "alkyl" group are methyl, ethyl, n-propyl, iso-propyl, n-butyl, iso-butyl, sec-butyl, t-butyl, iso-pentyl, neo-pentyl, iso-amyl, n-hexyl, 3-methylhexyl, 2,2-dimethylpentyl, 2,3-dimethylpentyl, and n-heptyl.

As used herein, the term "halogenated alkyl" indicates an alkyl group wherein at least one hydrogen atom is substituted with a halogen atom. Examples of a halogen atoms are fluorine (F), chlorine (Cl), bromine (Br), and iodine (I). Perhaloalkyl groups are specifically included, wherein every hydrogen atom is substituted with the same or different halogen atom, for example perfluoroalkyl groups.

The term "vinyl" as used herein includes groups containing a terminal ethylenically saturated group, and thus includes groups of the formula —CH=CH$_2$ and —CH$_2$CH=CH$_2$, as well as acrylate groups and methacrylate groups.

Hereinafter, an ion exchange membrane filling composition according to an embodiment will be described in detail.

According to an embodiment, an ion exchange membrane filling composition includes a first aromatic vinyl monomer having a halogenated alkyl group or a quaternary ammonium salt group. The term "ion exchange membrane filling composition" used herein refers to "a composition that is used to fill a porous substrate having ion exchanging properties." In the first aromatic vinyl monomer, groups of the formula —CH=CH$_2$ and —CH$_2$CH=CH$_2$ are especially useful.

The halogenated alkyl group may include 1 to 10 carbon atoms, specifically, 1 to 5 carbon atoms, more specifically, 1 carbon atom. In addition, the halogenated alkyl group may include chlorine (Cl), fluorine (F), bromine (Br), and/or iodine (I).

The quaternary ammonium salt group may act as an anion exchanger.

The quaternary ammonium salt group may be obtained by aminating the halogenated alkyl group.

As the amount of the first aromatic vinyl monomer in the ion exchange membrane filling composition increases, an ion exchange capacity ("IEC") of the finally produced ion exchange membrane also increases. The term "ion exchange capacity" ("IEC") used herein indicates the amount of ions which can be exchanged in an ion exchange membrane, measured by argentometric titration.

The first aromatic vinyl monomer may include at least one selected from vinylbenzyl chloride ("VBC"), (vinylbenzyl) trimethylammonium chloride, 1-allyl-3-methylimidazolium chloride, and O-allyl-N-benzylcinchonidinium chloride.

The ion exchange membrane filling composition may further include at least one of a second aromatic vinyl monomer and a cross-linking agent. The second aromatic vinyl monomer and the cross-linking agent may improve the mechanical strength and chemical stability of the obtained ion exchange membrane.

The second aromatic vinyl monomer is used as a co-monomer and differs from the first aromatic vinyl monomer in that it does not have the halogenated alkyl group and a quaternary ammonium salt group. The second aromatic vinyl monomer may include an ethylenically unsaturated group, for example a vinyl group, allyl group, acrylate group, or methacrylate group, and thus may include at least one selected from styrene, benzylmethacrylate, phenylmethacrylate, and bisphenol A dimethacrylate.

The cross-linking agent is reactive with at least the first aromatic vinyl monomer, and may include at least one selected from divinylbenzene ("DVB"), glutaraldehyde, glycidyl methacrylate, diethylene glycol, and a diacrylate or dimethacrylate such as ethylene diacrylate, 1,6-hexane diol dimethacrylate, and the like.

The amount of the second aromatic vinyl monomer may be about 1.0 mole or less per 1.0 mole of the first aromatic vinyl monomer. When the amount of the second aromatic vinyl monomer is within the foregoing range, an ion exchange membrane having high ionic conductivity may be obtained. Specifically, the amount of the second aromatic vinyl monomer may be in a range of about 0.1 to about 0.5 moles per 1.0 mole of the first aromatic vinyl monomer.

The amount of the cross-linking agent may be about 0.5 moles or less per a total of 1.0 mole of the first aromatic vinyl monomer and the second aromatic vinyl monomer. When the amount of the cross-linking agent is within the foregoing range, an ion exchange membrane having excellent mechanical properties may be obtained. Specifically, the amount of the cross-linking agent may be in a range of about 0.1 to about 0.2 moles per a total of 1.0 mole of the first aromatic vinyl monomer and the second aromatic vinyl monomer.

The ion exchange membrane filling composition may further include a solvent.

The solvent may include at least one compound selected from water, methanol, ethanol, dimethylacetamide ("DMA"), N-methyl-2-pyrrolidone ("NMP"), dimethylformamide ("DMF"), dimethyl sulfoxide ("DMSO"), and tetrahydrofuran ("THF").

The amount of the solvent in the ion exchange membrane filling composition may be in a range of 0 to about 50 percent by weight ("wt %"). When the amount of the solvent is within the foregoing range, the drying time of the polymerized ion exchange membrane filling composition may be reduced and a uniform film may be obtained.

The ion exchange membrane filling composition may further include a thermal polymerization initiator or a photopolymerization initiator.

The thermal polymerization initiator may include at least one selected from benzoyl peroxide ("BP"), potassium persulfate, ammonium persulfate, sodium persulfate, ammonium bisulfate, sodium bisulfate, azobisisobutyronitrile ("AIBN"), 1,1'-azobis(1-methylbutyronitrile-3-sodium sulfonate), and 4,4'-azobis(4-cyanovaleric acid).

The photopolymerization initiator may include at least one selected from 2,2-dimethoxy-2-phenylacetophenone, 2-oxoglutaric acid, 1-hydroxycyclohexylphenyl methanone, and 2-hydroxy-2-methylpropiophenone.

The amount of the thermal polymerization initiator may be about 0.01 moles or less per a total of 1.0 mole of the first aromatic vinyl monomer, the second aromatic vinyl monomer, and the cross-linking agent. When the amount of the thermal polymerization initiator is within the foregoing range, a polymerization product having a uniform composition, and thus an ion exchange membrane including the polymerization product having the uniform composition, may be obtained. Specifically, the amount of the thermal polymerization initiator may be in a range of about 0.001 to about 0.008 moles per the total of one mole of the first aromatic vinyl monomer, the second aromatic vinyl monomer, and the cross-linking agent.

The amount of the photopolymerization initiator may be about 0.01 moles or less per a total of 1.0 mole of the first aromatic vinyl monomer, the second aromatic vinyl monomer, and the cross-linking agent. When the amount of the photopolymerization initiator is within the foregoing range, a polymerization product having a uniform composition, and thus an ion exchange membrane including the polymerization product having the uniform composition, may be obtained. Specifically, the amount of the photopolymerization initiator may be in a range of about 0.001 to about 0.008 moles per a total of 1.0 mole of the first aromatic vinyl monomer, the second aromatic vinyl monomer, and the cross-linking agent.

Hereinafter, a method of preparing an ion exchange membrane, according to an embodiment, will be described in detail with reference to FIG. 1.

Figure 1:
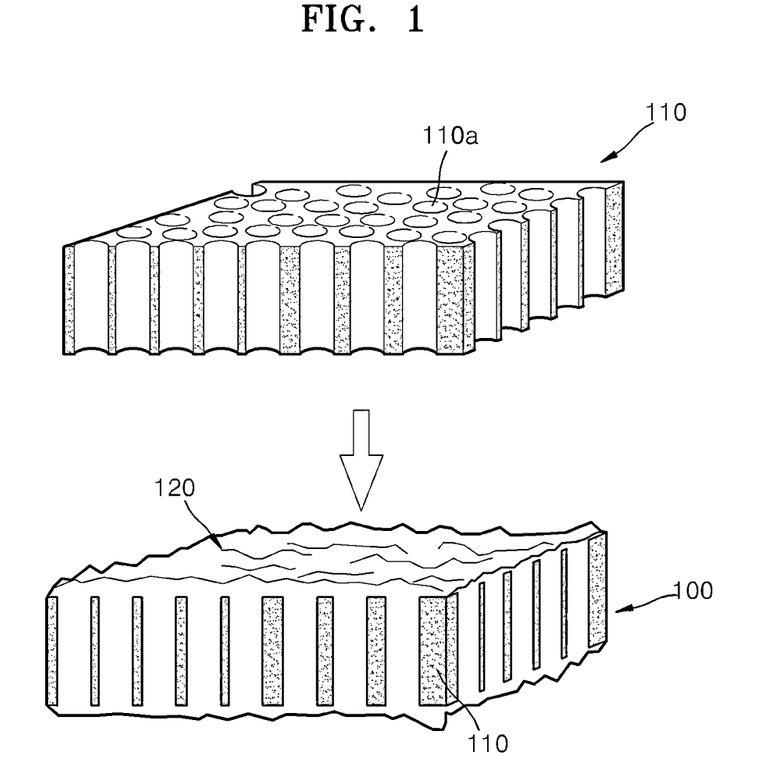
FIG. 1 is a diagram illustrating a method of preparing an ion exchange membrane, according to an embodiment.

FIG. 1 is a diagram illustrating a method of preparing an ion exchange membrane 100, according to an embodiment.

Referring to FIG. 1, the method of preparing the ion exchange membrane 100 includes impregnating a porous substrate film 110 having ion exchanging properties with the ion exchange membrane filling composition 120, and polymerizing the ion exchange membrane filling composition 120 filled into the porous substrate film 110.

The thickness of the porous substrate film 110 may be about 30 micrometers ("µm") or less, specifically, about 20 µm or less, more specifically, about 10 µm or less, and may be as thin as 10 nanometers. If the thickness of the porous substrate film 110 is within the foregoing range, film resistance may be reduced.

The porous substrate film 110 may include at least one compound selected from polyolefin, polytetrafluoroethylene, polyetheretherketone, polysulfone, polyimide, and polyamideimide. The porous substrate film 110 may have pores 110a each having a size of about 0.01 to about 0.1 µm, specifically, about 0.05 to about 0.1 µm.

If the ion exchange membrane filling composition 120 is thermally polymerized, the polymerization process may be performed at a temperature of about 40 to about 80° C. for about 2 to about 10 hours. During the polymerization process, a volatile material (such as an organic solvent) included in the ion exchange membrane filling composition 120 may be removed, for example by evaporation.

When the ion exchange membrane filling composition 120 is photopolymerized, the polymerization process may be performed under irradiation with ultraviolet rays at room temperature (which is about 20 to about 30° C.) for about 30 minutes to about 1 hour. When the ion exchange membrane filling composition 120 is photopolymerized, the method of preparing an ion exchange membrane may further include drying process. The drying process may be performed at a temperature of about 40 to about 80° C. for about 2 to about 10 hours. During the drying process, a volatile material (such as, an organic solvent) included in the ion exchange membrane filling composition 120 may be removed, for example by evaporation.

The method of preparing an ion exchange membrane may further include substituting a non-effective ion included in the first aromatic vinyl monomer or a polymerization product thereof with an effective ion. The term "effective ion" as used herein refers to an electrolyte component that permeates through the ion exchange membrane to enable charging and discharging of a redox flow battery. Non-limiting examples of the effective ions include $BF_4^-$, $PF_6^-$, $CF_3SO_3^-$, and $(CF_3SO_2)_2N^-$. The term "non-effective ion" as used herein refers to an ion that is not an "effective ion." Non-limiting examples of the non-effective ions include a halogen anion, specifically, a fluorine anion, a chlorine anion, a bromine anion, or an iodine anion.

The substitution may be performed by using a polycarbonate ("PC")/triethylamine tetrafluoroborate ("TEABF$_4$") solution, a polycarbonate ("PC")/lithium bis(trifluoromethanesulfonyl)imide ("LiTFSI") solution, or the like.

The ion exchange membrane 100 prepared by using the method described above has more ion channels, which constitute ion flow passages, than the porous substrate film 110. Therefore, the ion exchange membrane 100 has high permeability to an effective ion and a low crossover of electrolyte components except for the effective ion.

Hereinafter, an ion exchange membrane according to an embodiment will be described in detail.

The ion exchange membrane according to an embodiment includes a polymerization product of the ion exchange membrane filling composition 120 described above.

The ion exchange membrane may have an ionic conductivity of about $1.0 \times 10^{-4}$ Siemens per centimeter ("S/cm") or greater, specifically, about $2.0 \times 10^{-4}$ to about $5.0 \times 10^{-4}$ S/cm.

The ion exchange membrane may have an IEC of 2.0 milliequivalents per gram dry weight ("meq/g dry weight") to 5.0 meq/g dry weight. The term "meq" used herein indicates an abbreviation of milliequivalent, and the term "dry weight" used herein indicates a weight of a dried ion exchange membrane.

The ion exchange membrane may be used in an organic-based electrolyte.

With regard to the IEC, a conventional ion exchange membrane that is optimized in an aqueous electrolyte usually has a relatively high swelling ratio, and therefore is disadvantageous. To prevent a reduction in ion selectivity and poor film properties that is caused by the reduction in ion selectivity, the IEC of the ion exchange in such a membrane is limited to about 1.0 to about 2.0 meq/g of dry weight. However, when the ion exchange membrane according to an embodiment is optimized in an organic-based electrolyte, the swelling ratio of the ion exchange membrane may be low enough (specifically, 2.0 to 5.0 meq/g dry weight) that the ion exchange membrane would have a high IEC, thereby preventing the reduction in ion selectivity.

The ion exchange membrane may have a thickness of about 20 to about 100 µm, specifically, about 40 to about 100 µm, more specifically, about 40 to about 80 µm.

Hereinafter, a redox flow battery according to an embodiment will be described in detail with reference to FIG. 2.

Figure 2:
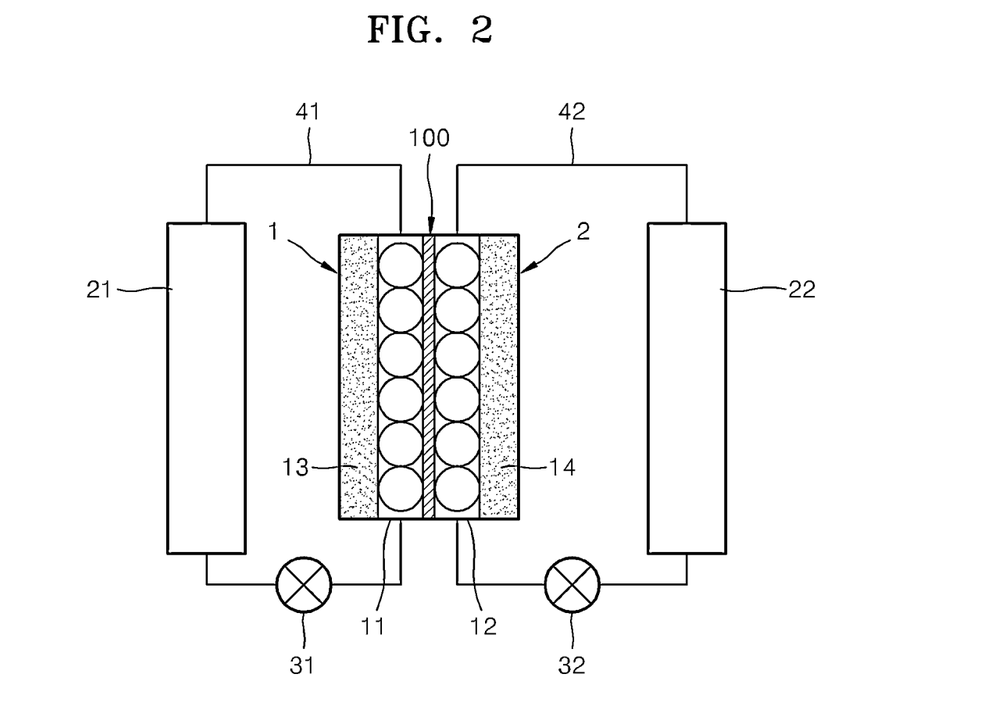
FIG. 2 is a schematic view of a redox flow battery according to an embodiment.

FIG. 2 is a schematic view of a redox flow battery according to an embodiment.

Referring to FIG. 2, the redox flow battery according to an embodiment includes a cathode cell 1, an anode cell 2, an ion exchange membrane 100 that separates the cathode cell 1 from the anode cell 2, a first tank 21 communicating with the cathode cell 1 and a second tank 22 communicating with the anode cell 2.

The cathode cell 1 may include a cathode 13 and a catholyte 11.

The anode cell 2 may include an anode 14 and an anolyte 12.

Charging and discharging may occur as a result of a redox reaction occurring at the cathode 13 and the anode 14.

Each of the cathode 13 and the anode 14 may include at least one material selected from carbon felt, carbon cloth, carbon paper, and metal foam.

At least one of the catholyte 11 and the anolyte 12 may be an organic electrolyte.

The organic electrolyte may include a non-aqueous solvent, a supporting electrolyte, and a metal-ligand coordination compound.

The non-aqueous solvent may include at least one compound selected from dimethyl acetamide, diethyl carbonate, dimethyl carbonate, acetonitrile, γ-butyrolactone ("GBL"), propylene carbonate ("PC"), ethylene carbonate ("EC"), N-methyl-2-pyrrolidone ("NMP"), fluoroethylene carbonate, and N,N-dimethylacetamide ("DMA").

The supporting electrolyte does not directly participate in reactions and serves to maintain a charge balance between a catholyte and an anolyte. The supporting electrolyte may include at least one compound selected from $LiBF_4$, $LiPF_6$, $LiClO_4$, $LiCF_3SO_3$, $Li(CF_3SO_2)_2N$, triethylamine tetrafluoroborate ("TEABF$_4$"), 1-ethyl-2-methylpyrazolium tetrafluoroborate ("EMPBF$_4$"), spiro-(1,1')-bipyrrolidium tetrafluoroborate ("SBPBF$_4$"), piperidine-1-spiro-1'-pyrrolidinium tetrafluoroborate ("PSPBF$_4$"), tributylamine tetrafluoroborate ("TBABF$_4$"), and lithium bis(trifluoromethanesulfonyl) imide ("LiTFSI").

The metal included in the metal-ligand coordination compound may include at least one metal selected from iron (Fe), nickel (Ni), cobalt (Co), ruthenium (Ru), zinc (Zn), manganese (Mn), yttrium (Y), zirconium (Zr), titanium (Ti), chromium (Cr), magnesium (Mg), cerium (Ce), copper (Cu), lead (Pb), and vanadium (V).

The ligand included in the metal-ligand coordination compound may include at least one selected from dipyridyl, terpyridyl, ethylenediamine, propylenediamine, phenanthroline, and 2,6-bis(methylimidazole-2-ylidene)pyridine.

During oxidation and reduction, two or more electrons may move from the metal-ligand coordination compound.

The metal-ligand coordination compound may include at least one of compounds represented by the following formulae:

The ion exchange membrane 100 may allow only the effective ion (e.g., a charge carrier ion of a supporting electrolyte) to permeate through the membrane and may prevent permeation of other electrolyte components (that is, components other than the effective ion) included in the catholyte 11 and the anolyte 12 through the membrane. An example of the ion exchange membrane 100 may be the ion exchange membrane described above, or an anion exchange membrane.

The first tank 21 stores the catholyte 11 and communicates with the cathode cell 1 via a tube 41. Likewise, the second tank 22 stores the anolyte 12 and communicates with the anode cell 2 via a tube 42.

The catholyte 11 is circulated via a first pump 31, and the anolyte 12 is circulated via a second pump 32.

The operating principle of the redox flow battery is disclosed in Korean Patent Publication No. 2011-0088881, which is incorporated herein in its entirety by reference.

In addition to existing mobile phones and mobile computers the redox flow battery may be used in applications that require high capacity and high power output, such as an electric vehicle. The redox flow battery may also be combined with an existing internal combustion engine, a fuel cell, a super capacitor, or a similar device for use in a hybrid vehicle. The redox flow battery may also be used in other applications that require high power output and high voltage.

One or more embodiments will now be described more fully with reference to the following examples. However, these examples are for illustrative purposes only and are not intended to limit the scope of the invention.

EXAMPLES

Examples 1 to 8

Selection and Pretreatment of Porous Substrate Film

A porous substrate film (Highpore 25 μm (film thickness) available from Asahi Kasei Chemicals) was immersed in a 20 wt % aqueous sulfuric acid solution for 12 hours and washed therewith. Subsequently, the wet porous substrate film was dried in a drying oven at 80° C. for 3 hours.

Preparation of Ion Exchange Membrane Filling Composition

Styrene ("S"), vinylbenzyl chloride ("VBC"), divinyl benzene ("DVB"), and benzoyl peroxide ("BPO") were mixed to prepare an ion exchange membrane filling composition. Mixing molar ratios of S to VBC are shown in Table 1 below. In Examples and Comparative Example, the amount of DVB was 0.1 moles per a total of one mole of S and VBC, and the amount of BPO was 0.5 moles per a total of one mole of S, VBC, and DVB. The ion exchange membrane filling compositions prepared according to Examples 1 to 4 were identical to each other.

TABLE 1

| | Examples | | | | | | | |
|---|---|---|---|---|---|---|---|---|
| | 1 | 2 | 3 | 4 | 5 | 6 | 7 | 8 |
| Molar ratio of S to VBC | 1:2 | 1:2 | 1:2 | 1:2 | 1:3 | 1:4 | 1:5 | 1:6 |

Preparation of Ion Exchange Membrane

The pre-treated porous substrate film was immersed in a beaker filled with each ion exchange membrane filling composition to impregnate the pretreated porous substrate film with the above compositions. Subsequently, the impregnated porous substrate film was put in a drying oven and heated at 80° C. for 3 hours to polymerize the monomers (i.e., S, VBC, and DVB). Then, the impregnated porous substrate film was immersed in a 0.5 M aqueous trimethylamine solution and heated in a drying oven at 50° C. for 1 hour to aminate a halogenated alkyl group (i.e., a chloromethyl group) included in the polymerization product. Subsequently, the aminated porous substrate film was washed with distilled water to remove a solvent remaining on a surface of the porous substrate film. Then, the washed porous substrate film was immersed in a 0.5 M aqueous NaCl solution and immersed in a 0.5 M aqueous NaOH solution for 3 hours. Subsequently, the resultant porous substrate film was immersed in a 0.5 M aqueous NaOH solution to completely substitute $Cl^-$ ions included in the porous substrate film with $OH^-$ ions. Thereafter, the porous substrate film was washed with distilled water and dried. Then, a $PC/TEABF_4$ solution (wherein concentration of $TEABF_4$ was 0.5 M) was used to substitute $OH^-$ ions included in the porous substrate film with $BF_4^-$ ions to complete the preparation of ion exchange membranes. The ion exchange membranes prepared according to Examples 1 to 4 were identical to each other.

Manufacture of Redox Flow Battery

A redox flow battery was manufactured as follows:

An electrode was prepared by heat treating carbon felt (Nippon Graphite, GF20-3, having thickness of 3 mm and size of 5 cm×5 cm) under atmospheric pressure at 500° C. for 5 hours, which was used as a cathode and anode.

The ion exchange membranes was prepared as described above.

As a catholyte, a 0.2 M solution of Fe (2,2'-bipyridine)$_3$ $(BF_4)_2$ and a 0.5 M $SBPBF_4$ in a PC solvent were used, and as an anolyte, a 0.1M solution of Ni(2,2'-bipyridine)$_3BF_4$ and a 0.5 M solution of $SBPBF_4$ in a PC solvent were used.

In particular, an insulating material (Teflon film), a current collector (gold plate), and a bipolar plate (graphite) were stacked on a nut-integrated end plate. The bipolar plate had a gas leak hole. Subsequently, a square carbon felt electrode having a size of 5 cm×5 cm was cut in half to obtain two rectangular electrodes of a size of 2.5 cm×5 cm. One of the electrodes was inserted into a concave surface of the bipolar plate to manufacture a cathode cell. Likewise, the other electrode was used to manufacture an anode cell. Then, 3 ml of the catholyte was injected into the cathode cell to complete the manufacture of the cathode cell. Also, 3 ml of the anolyte was injected into the anode cell to complete the manufacture of the anode cell. Subsequently, the cathode cell and the anode cell were arranged to face each other. Four bolts into which Belleville springs were inserted were passed through the two cells, and the bolts were tightened in a diagonal sequence by using a torque wrench until the torque reached 1.5 Newton meters ("Nm"). After this assembly had been furnished, the remaining electrolytes were injected through liquid injection pores of the respective electrodes, and the pores were closed with a Teflon bolt, thereby completing the manufacture of a redox flow battery. The redox flow batteries manufactured according to Examples 1 to 4 were identical to each other.

Example 9

An ion exchange membrane and a redox flow battery were manufactured in the same manner as in Example 5, except that a Highpore film having a thickness of 23 μm, available from Asahi Kasei Chemicals, was used as a porous substrate film in the preparation of the ion exchange membrane.

Example 10

An ion exchange membrane and a redox flow battery were manufactured in the same manner as in Example 5, except that the polymerization of the monomers in the preparation of the ion exchange membrane was performed at 120° C. instead of a temperature of 80° C.

Example 11

An ion exchange membrane and a redox flow battery were manufactured in the same manner as in Example 5, except that a Highpore film having a thickness of 55 μm, available from Asahi Kasei Chemicals, was used as a porous substrate film in the preparation of the ion exchange membrane.

Example 12

An ion exchange membrane and a redox flow battery were manufactured in the same manner as in Example 5, except that SK_LIBs available from SK was used as a porous substrate film in the preparation of the ion exchange membrane.

Example 13

An ion exchange membrane and a redox flow battery were manufactured in the same manner as in Example 5, except that F20BHE available from Exxon Mobil was used as a porous substrate film in the preparation of the ion exchange membrane.

Comparative Example 1

A general porous substrate film (FAP4 available from Fuma-tech) that was not impregnated with an ion exchange membrane filling composition was used as an ion exchange membrane. That is, by using the same method as that used to prepare the ion exchange membranes of Examples 1 to 8, Cr ions included in the general porous substrate film were substituted with OW ions, the OW ions were subsequently substituted with $BF_4^-$ ions, and the resultant porous substrate film was then used as an ion exchange membrane. A redox flow battery was manufactured using the treated general porous substrate film in the same manner as in Examples 1 to 8.

Comparative Example 2

An ion exchange membrane and a redox flow battery were manufactured in the same manner as in Examples 1 to 8, except that the ion exchange membrane filling composition of Example 5 was directly coated on a glass plate to a thickness of 60 μm in the preparation of the ion exchange membrane (that is, a porous substrate film was not used).

EVALUATION EXAMPLE

Evaluation Example 1

Evaluation of Properties of Ion Exchange Membrane
(1)

The ion exchange membranes prepared according to Examples 1 to 8 and Comparative Examples 1 and 2 were each immersed in propylene carbonate ("PC") for a certain period of time. An immersion time for each ion exchange membrane is shown in Table 2 below. The ion exchange membranes of Examples 1 to 4 were identical to each other, but the immersion time for each ion exchange membrane in the evaluation of properties of each ion exchange membrane was different.

After the immersion, ionic conductivity, IEC, and a Young's modulus of each ion exchange membrane were measured by using the following method. The results are shown in Table 2 below.

Ionic Conductivity Measurement

A SOLARTRON® 1260 Impedance spectroscopy manufactured by Solartron Analytical was used to measure the ion conductivity. Also, the measurement frequency range was in a range of about 0.1 Hz to about 1 MHz.

IEC Measurement

An IEC was measured by argentometric titration. The measurement method was as follows:

(1) 100 mg of a sample (optionally distilled with water) was used. In this regard, the sample indicates the ion exchange membrane.

(2) If the chromaticity of the sample was high, 3 ml of $Al(OH)_3$ was added to the sample and the resultant sample was stirred, precipitated, and filtered.

(3) pH of the sample was adjusted to 7 to 8.

(4) 1 ml of $K_2CrO_4$ (yellow indicator) was added to the sample.

(5) The sample was titrated with $AgNO_3$.

(6) End point: Pinkish yellow end point

Measurement of Young's Modulus

To measure Young's modulus, a UTM tensile strength testing machine (KTI2010 manufactured by Lloyd instruments) was used.

TABLE 2

|  | Immersion time (hr) | Ionic conductivity ($10^{-4}$ S/cm) | IEC (meq/g-dry weight) | Young's modulus (Mpa) |
|---|---|---|---|---|
| Example 1 | 1 | 0.80 | 1.72 | 1702 |
| Example 2 | 3 | 1.85 | 1.90 | 2628 |
| Example 3 | 5 | 2.67 | 1.97 | 1732 |
| Example 4 | 10 | 1.85 | 1.79 | 2368 |
| Example 5 | 1 | 1.04 | 2.56 | 2334 |
| Example 6 | 1 | 1.60 | 2.51 | 1605 |
| Example 7 | 1 | 1.30 | 2.69 | 2933 |
| Example 8 | 1 | 1.60 | 2.92 | 2201 |
| Comparative Example 1 | 0 | 1.50 | 1.67 | 1237 |
| Comparative Example 2 | 0 | 3.20 | 3.28 | 480 |

As shown in Table 2, it was determined that even if IECs of the ion exchange membranes of Examples 5 to 8 were greater than 2 meq/g dry weight, each ion exchange membrane had a high ionic conductivity, i.e., $1.0 \times 10^{-4}$ S/cm or more, and a high Young's modulus, i.e., 1,600 megaPascal ("Mpa") or more. On the contrary, the general ion exchange membrane of Comparative Example 1 had a relatively high ionic conductivity and Young's modulus ($1.50 \times 10^{-4}$ S/cm and 1,237 Mpa, respectively), while it had an IEC of less than 2 meq/g dry weight. Also, the ion exchange membrane of Comparative Example 2 had very high ionic conductivity and IEC (each was at least 3.0), while its Young's modulus was fairly low, i.e., 500 Mpa or less, due to the absence of the porous substrate film.

Evaluation Example 2

Evaluation of Properties of Ion Exchange Membrane (2)

A water swelling ratio ("WSR"), a solvent swelling ratio ("SSR"), and an IEC of each of the ion exchange membranes of Examples 5 and 9 to 13 and Comparative Example 1 were measured using the following method. The results are shown in Table 3 below and FIG. 3.

Measurement of WSR

Each ion exchange membrane was immersed in distilled water for 12 hours, and the WSR was measured by Equation 1 below:

WSR(%) is a ratio of a mass of ion exchange membrane after immersion in distilled water to a mass of dried ion exchange membrane before immersion in distilled water×100%.    Equation 1

Measurement of SSR

Each ion exchange membrane was immersed in PC for 12 hours, and SSR thereof was measured by Equation 2 below:

SSR(%)=a ratio of a mass of ion exchange membrane after immersion in PC to a mass of dried ion exchange membrane before immersion in PC×100%.    Equation 2

IEC Measurement

An IEC was measured in the same manner as in Evaluation Example 1.

TABLE 3

|  | WSR (%) | SSR (%) | IEC (meq/g dry weight) |
|---|---|---|---|
| Example 5 | 47.5 | 8.8 | 2.56 |
| Example 9 | 39.0 | 10.8 | 2.46 |
| Example 10 | 30.7 | 10.1 | 2.70 |
| Example 11 | 63.0 | 16.1 | 2.85 |
| Example 12 | 35.8 | 17.3 | 2.20 |
| Example 13 | 45.8 | 11.5 | 2.65 |
| Comparative Example 1 | 65.1 | 19.5 | 1.70 |

Figure 3:
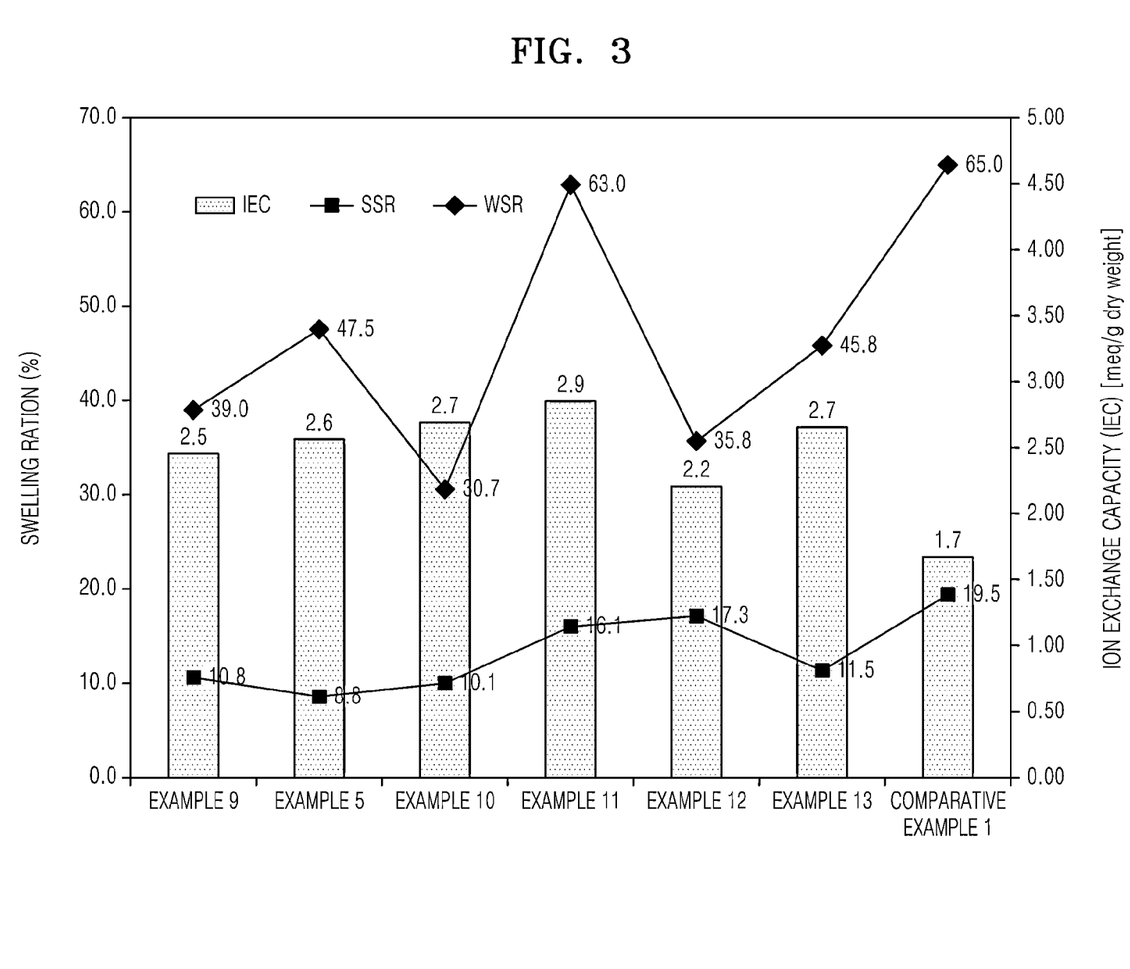
FIG. 3 is a graph showing swelling ratios (percent, %) and ion exchange capacities ("IEC", milliequivalent per gram dry weight, meq/g dry weight) of ion exchange membranes prepared according to Examples 5 and 9 to 13 and Comparative Example 1.

Referring to Table 3 and FIG. 3, the ion exchange membranes of Examples 5 and 9 to 13 have lower WSR and SSR and higher IEC than those of the ion exchange membrane of Comparative Example 1. In particular, the ion exchange membranes of Examples 5 and 9 to 13 exhibited an IEC that is greater than 2 meq/g of dry weight.

Evaluation Example 3

Surface Analysis of Ion Exchange Membrane

Figure 4:
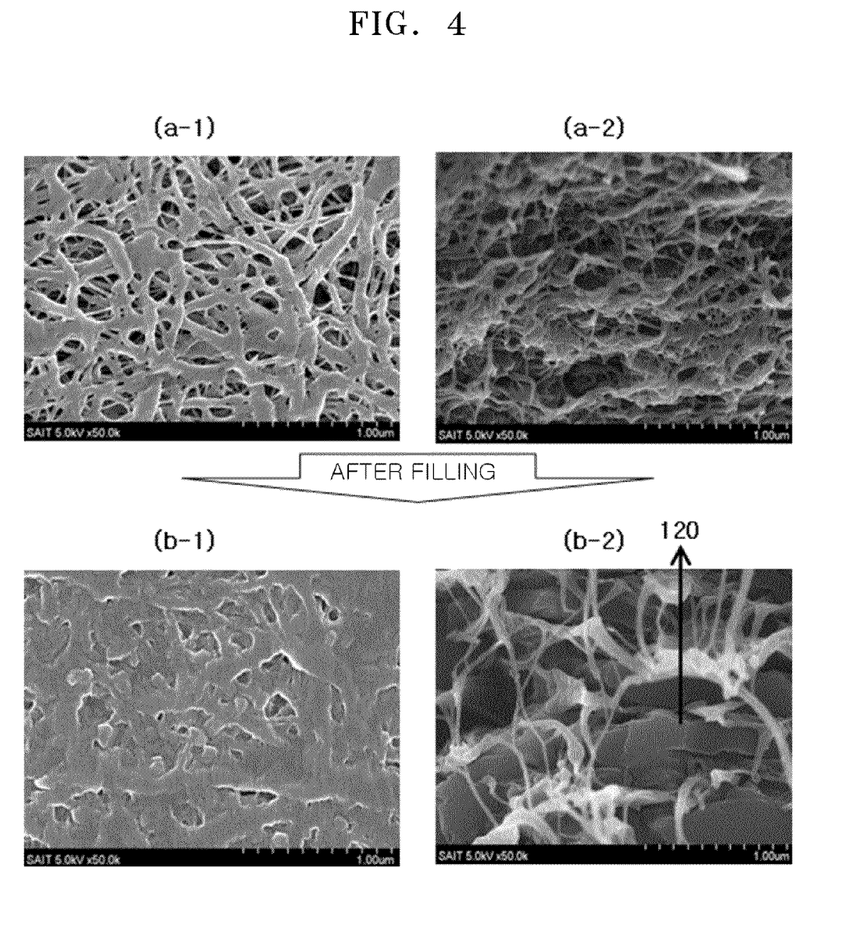
FIG. 4 illustrates scanning electron microscopic ("SEM") images of a porous substrate film used in Example 5 and the ion exchange membrane prepared in Example 5.

FIG. 4 illustrates scanning electron microscopic ("SEM") images of the porous substrate film used in Example 5 and the ion exchange membrane prepared in Example 5. The (a-1) image of FIG. 4 shows a surface of the porous substrate film, the (a-2) image of FIG. 4 shows a cross-section of the porous substrate film, the (b-1) image of FIG. 4 shows a surface of the ion exchange membrane, and the (b-2) image of FIG. 4 shows a cross-section of the ion exchange membrane.

As shown in FIG. 4, it was confirmed that pores of the porous substrate film illustrated in (a-1) and (a-2) were filled with a polymerization product of the ion exchange membrane filling composition to form the ion exchange membrane illustrated in (b-1) and (b-2).

Evaluation Example 4

Evaluation of Characteristics of Redox Flow Battery

Figure 5:
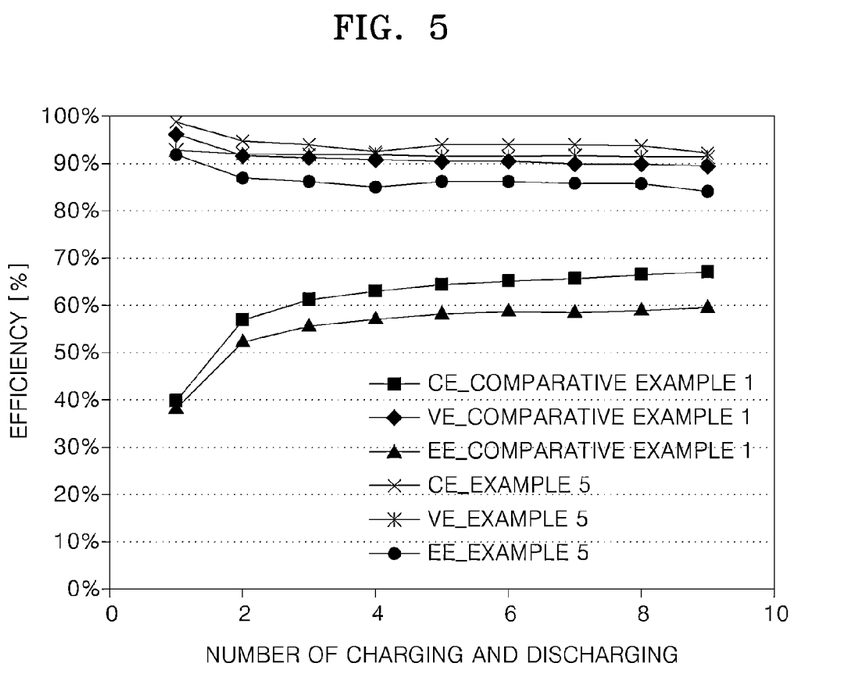
FIG. 5 is a graph of charging and discharging efficiency (percent, %), voltage efficiency (percent, %), and energy efficiency (percent, %) versus a number of charging and discharging of each of the redox flow batteries prepared in Example 5 and Comparative Example 1.
Figure 6:
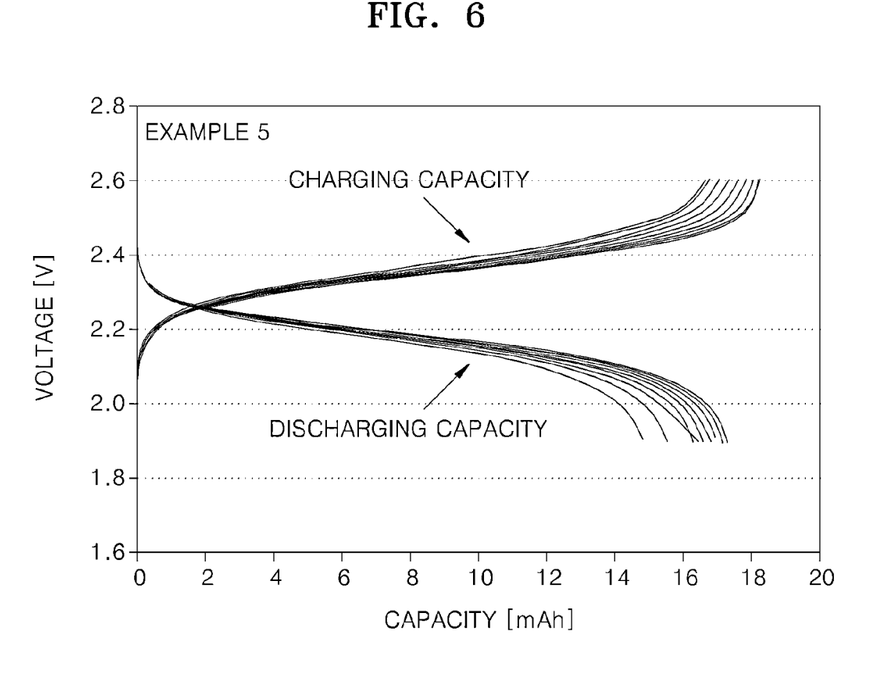
FIG. 6 is a graph of voltage (volts, V) versus capacity (milliAmperes times hour, mAxh) showing changes in charging and discharging capacities with respect to the number of cycles of charging and discharging of the redox flow battery prepared in Example 5.

Charging and discharging tests were performed at room temperature (25° C.) on the redox flow batteries manufactured according to Example 5 and Comparative Example 1, and the results are shown in Table 4 below. In addition, only efficiency data of the redox flow batteries of Example 5 and Comparative Example 1 are illustrated in FIG. 5, and only charging and discharging capacity data of the redox flow battery of Example 5 is illustrated in FIG. 6.

Charging and discharging conditions were as follows: the redox flow batteries were charged with a constant current of 20 milliAmperes ("mA") until the voltage reached 2.5 volts ("V"), and then were discharged with a constant current of 20 mA until the voltage decreased to 2.0 V. The charging and discharging were repeatedly performed 17 times.

In Table 4 below and FIG. 5, the charging and discharging efficiency ("CE") refers to the percentage of the discharged charge amount divided by the charged charge amount, the voltage efficiency ("VE") refers to the percentage of the average discharge voltage divided by the average charge voltage, and the energy efficiency ("EE") refers to the product of the voltage efficiency and the charging and discharging efficiency.

TABLE 4

|  | Example | | | | | | | | Comparative Example | |
|---|---|---|---|---|---|---|---|---|---|---|
|  | 1 | 2 | 3 | 4 | 5 | 6 | 7 | 8 | 1 | 2 |
| Charging and discharging efficiency (CE) (%) | 90 | 95 | 88 | 93 | 92 | 93 | 89 | 89 | 68 | — |
| Voltage efficiency (VE) (%) | 93 | 93 | 93 | 93 | 92 | 92 | 92 | 92 | 91 | — |
| Energy efficiency (EE) (%) | 84 | 88 | 82 | 86 | 85 | 86 | 81 | 81 | 60 | — |

As shown in Table 4, the redox flow batteries manufactured according to Examples 1 to 8 exhibited higher charging and discharging efficiency, voltage efficiency, and energy efficiency than those of the redox flow battery of Comparative Example 1. The charging and discharging test could not be performed on the redox flow battery of Comparative Example 2 due to its deteriorated mechanical property.

In particular, referring to FIG. 5, it is determined that the redox flow battery of Example 5 has higher charging and discharging efficiency, voltage efficiency, and energy efficiency than those of the redox flow battery of Comparative Example 1.

As shown in FIG. 6, it was determined that even though the number of charging and discharging cycles of the redox flow battery of Example 5 increased, its charging capacity and discharging capacity somewhat decreased.

Evaluation Example 5

Evaluation of Electrolyte Component Crossover

Following the charging and discharging test, a concentration of a non-effective ion (that is, Ni ion) passing through an ion exchange membrane was measured by using inductively coupled plasma ("ICP"), and the results of the test are shown in Table 5 below. In particular, after the charging and discharging test had been completed, a concentration of a Ni ion present in respective catholytes (that is, concentration of permeated electrolyte) was measured to evaluate the crossover of electrolyte components except for the effective ion.

TABLE 5

|  | Example | | | | | | | | Comparative Example | |
|---|---|---|---|---|---|---|---|---|---|---|
|  | 1 | 2 | 3 | 4 | 5 | 6 | 7 | 8 | 1 | 2 |
| Concentration of permeated electrolyte (wt ppm) | 100 | 81 | 78 | 86 | 78 | 80 | 65 | 99 | 280 | — |

Referring to Table 5, the crossover of electrolyte components except for the effective ion in the redox flow batteries of Examples 1 to 8 was reduced relative to that in the redox flow battery of Comparative Example 1.

As described above, according to the one or more of the above embodiments, ion exchange membranes may have optimized ion mobility characteristics and film properties in a non-aqueous system, that is, an organic system. Also, a redox flow battery including the ion exchange membrane has high charging and discharging efficiency, voltage efficiency, and energy efficiency.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. An ion exchange membrane comprising a polymerization product of a composition for filling an ion exchange membrane, the composition comprising a first aromatic vinyl monomer comprising a halogenated alkyl group or a quaternary ammonium salt group, a second aromatic vinyl monomer and a cross-linking agent,
   wherein the ion exchange membrane has an ion exchange capacity of about 2.0 meq/g dry weight to about 5.0 meq/g dry weight and a solvent swelling ratio (SSR) of 17.3 or less,
   wherein the ion-exchange membrane is used to selectively separate ions in a non-aqueous system, and
   wherein an amount of the second aromatic vinyl monomer is about 0.1 to about 0.5 moles per 1.0 mole of the first aromatic vinyl monomer, and wherein an amount of the cross-linking agent is about 0.1 to about 0.2 moles per a total of 1.0 mole of the first aromatic vinyl monomer and the second aromatic vinyl monomer.

2. The ion exchange membrane of claim 1, wherein the halogenated alkyl group comprises 1 to 10 carbon atoms.

3. The ion exchange membrane of claim 2, wherein the first aromatic vinyl monomer comprises at least one selected from vinylbenzyl chloride, (vinylbenzyl)trimethylammonium chloride, 1-allyl-3-methylimidazolium chloride, and O-allyl-N-benzylcinchonidinium chloride.

4. The ion exchange membrane of claim 1, wherein the second aromatic vinyl monomer comprises at least one selected from styrene, benzylmethacrylate, phenylmethacrylate, and bisphenol A dimethacrylate; and wherein the cross-linking agent comprises at least one selected from divinylbenzene, glutaraldehyde, glycidyl methacrylate, diethylene glycol, and dimethacrylate.

5. The ion exchange membrane of claim 1, wherein the composition further comprises a solvent.

6. The ion exchange membrane of claim 5, wherein the solvent comprises at least one compound selected from water, methanol, ethanol, dimethylacetamide, N-methyl-2-pyrrolidone, dimethylformamide, dimethyl sulfoxide, and tetrahydrofuran.

7. The ion exchange membrane of claim 5, wherein an amount of the solvent in the ion exchange membrane composition is in a range of greater than 0 to about 50 weight%.

8. The ion exchange membrane of claim 1, wherein the composition further comprises a thermal polymerization initiator or a photopolymerization initiator.

9. The ion exchange membrane of claim 1, wherein the ion exchange membrane is prepared by the method comprising:
    impregnating a porous substrate film having ion exchanging properties with the composition; and
    polymerizing the impregnated composition.

10. The ion exchange membrane of claim 9, wherein the porous substrate film comprises at least one compound selected from polyolefin, polytetrafluoroethylene, polyetheretherketone, polysulfone, polyimide, and polyamideimide.

11. The ion exchange membrane of claim 1, wherein a thickness of the ion exchange membrane is in a range of about 20 micrometers to about 100 micrometers.

12. A redox flow battery comprising:
    a catholyte;
    an anolyte; and
    the ion exchange membrane according to claim 1 disposed between the catholyte and the anolyte.

13. The redox flow battery of claim 12, wherein the ion exchange membrane is an anion exchange membrane, and the catholyte and the anolyte are an organic electrolyte.

* * * * *